United States Patent
Zhang

(10) Patent No.: US 12,362,901 B1
(45) Date of Patent: Jul. 15, 2025

(54) CLOCK RECOVERY IN SYMBOL-RATE DSP

(71) Applicant: ACACIA TECHNOLOGY, INC., San Jose, CA (US)

(72) Inventor: Hongbin Zhang, Maynard, MA (US)

(73) Assignee: Acacia Technology, Inc., San Jose, CA (US)

( * ) Notice: Subject to any disclaimer, the term of this patent is extended or adjusted under 35 U.S.C. 154(b) by 0 days.

(21) Appl. No.: 17/581,483

(22) Filed: Jan. 21, 2022

(51) Int. Cl.
 *H04L 7/00* (2006.01)
(52) U.S. Cl.
 CPC .......... *H04L 7/0079* (2013.01); *H04L 7/0016* (2013.01)
(58) Field of Classification Search
 CPC ... H04L 7/0079; H04L 7/0016; H04L 7/0054; H04L 7/0075; H04L 7/027; H04L 7/02
 See application file for complete search history.

(56) References Cited

U.S. PATENT DOCUMENTS

| | | | | |
|---|---|---|---|---|
| 7,529,295 B1* | 5/2009 | Nezami | ............... | H04L 27/0014 375/324 |
| 7,869,534 B2* | 1/2011 | Schmidt | .................. | H04L 7/027 375/322 |
| 8,233,575 B2* | 7/2012 | Zoltowski | ............... | H04L 7/027 375/345 |

* cited by examiner

*Primary Examiner* — Betsy Deppe
(74) *Attorney, Agent, or Firm* — Patterson + Sheridan, LLP

(57) ABSTRACT

In one aspect, the disclosure relates to a method of clock recovery. The method includes sampling one or more signals at a symbol rate to generate a set of samples; zero-padding one or more samples in the set of samples; filtering one or more zero-padded signals with a filter to generate a set of filtered samples; and modifying the set of filtered samples by applying a non-linear operator to generate an output comprising a spectral correlation.

15 Claims, 9 Drawing Sheets

CLOCK RECOVERY IN SYMBOL-RATE DSP

FIELD

This disclosure relates generally to the field of receiver digital signal processing.

BACKGROUND

Contemporary telecommunications systems make extensive use of digital signal processing methods and devices that are advantageously mass-produced in various configurations for various purposes.

SUMMARY

In part, in one aspect, the disclosure relates to a method of clock recovery from a received signal. Sampling a received signal for clock recovery may be done minimally at the symbol rate; that is, a clock may be recovered when a received signal is sampled at one sample per symbol. Lowering the sampling rate in this way may greatly reduce the power consumption of analog-to-digital conversion (ADC) and digital signal processing. Applications may be sensitive to error in the phase of a recovered clock. In some embodiments, the current disclosure teaches a method of clock recovery that accurately predicts clock phase error over the entire clock period. In addition, the method of the current disclosure is not sensitive to variations in signal-to-noise ratio (SNR).

In some embodiments, the current disclosure teaches a method that recovers a clock from a sampled signal by computing a spectral line from the spectral correlation of a received signal. However, Applicant has realized that a spectral correlation of frequency components spaced at the symbol rate is absent from signals sampled at the symbol rate. Therefore, in some embodiments, the current disclosure relates to a method of clock recovery from signals sampled at the symbol rate wherein samples are zero-padded, filtered with a low-pass filter, and modified with a non-linear operator so that the spectral correlation and thus the clock may be accurately recovered.

In one aspect, the disclosure relates to a method of clock recovery. The method includes sampling one or more signals at a symbol rate to generate a set of samples; zero-padding one or more samples in the set of samples; filtering one or more zero-padded signals with a filter to generate a set of filtered samples; and modifying the set of filtered samples by applying a non-linear operator to generate an output comprising a spectral correlation.

In one embodiment, the spectral correlation generated does not change for the one or more signals at the signal rate when the signal-to-noise ratio varies based on increasing and decreasing noise levels. In one embodiment, a spectral correlation of frequency components spaced at the symbol rate is absent from the one or more signals sampled at the symbol rate. In one embodiment, the filter is a low pass filter. In one embodiment, the method further includes recovering a clock for the one or more signals at the symbol rate. In one embodiment, the recovering a clock step comprises applying a discrete Fourier transform to the output. In one embodiment, the spectral correlation is $\langle X_k X_{k-N/2}^* \rangle$, where N is the DFT size. In one embodiment, the non-linear operator is $(x_2')^2$.

In one embodiment, the non-linear operator is an exponential operator. In one embodiment, the filter is configured to effectively double the sampled spectrum. In one embodiment, a non-linear operator is configured to modify the set of filtered samples such that spectral correlation does not vanish when signals are sampled at the symbol rate. In one embodiment, the method further includes estimating one or more clock phase errors over a clock period. In one embodiment, one or more clock phase errors is $\epsilon$, wherein $$\epsilon = \frac{1}{2\pi} \arg\left(\left\langle \sum_{k=0}^{N-1} X_k'' X_{k-N/2}''^* \right\rangle\right).$$

In one embodiment, the set of filtered samples comprises a sequence $\{x_n'\}$ that samples a continuous-time signal $x_a'(t)$ at two samples per symbol, i.e. $x_n' = x_a'(nT)$ where $$T = \frac{T_s}{2}.$$

In one embodiment, applying the linear operator does not cause aliasing.

Although the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
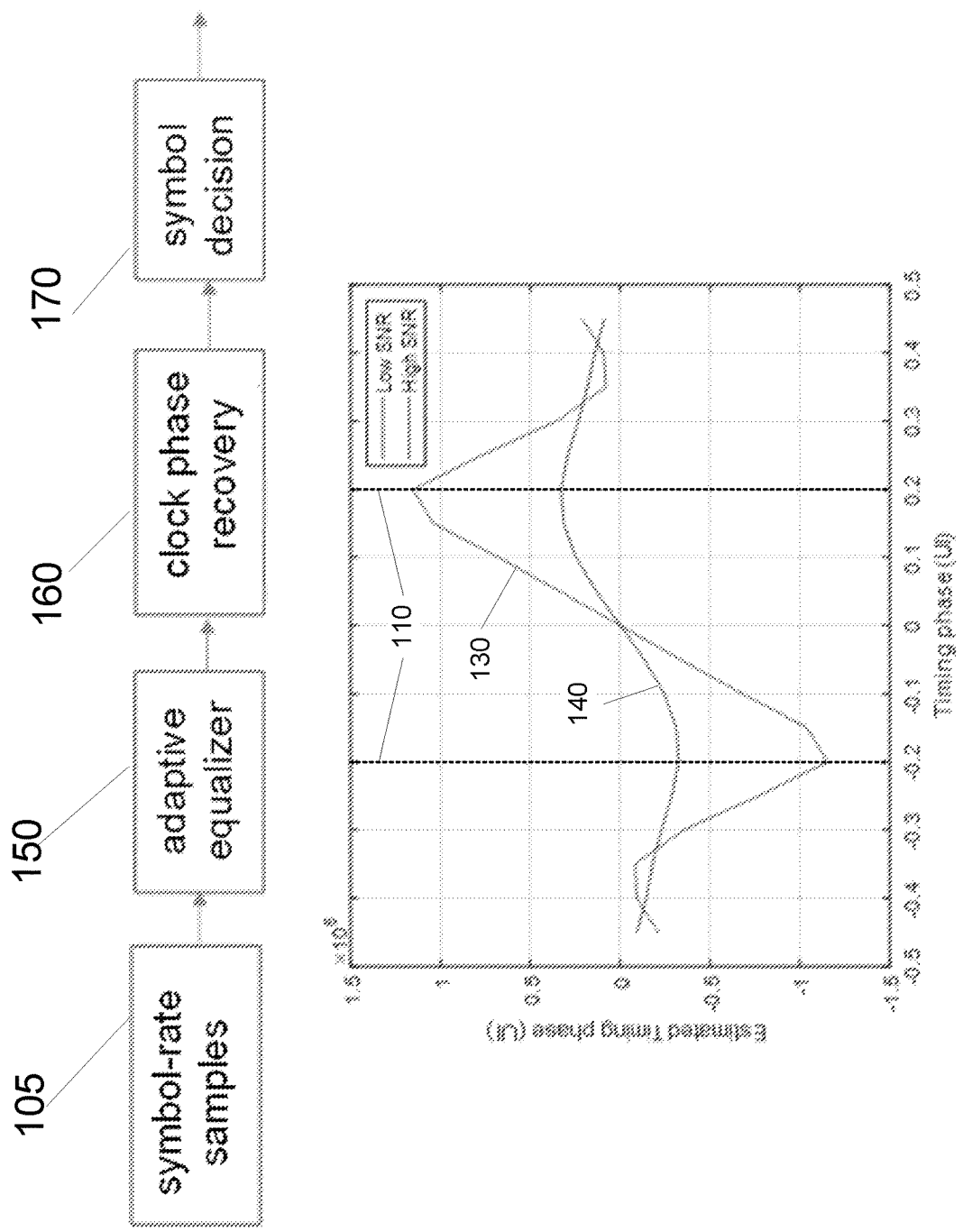
FIG. 1 is a representation of the performance of a method of clock recovery wherein estimated clock phase error is sensitive to signal-to-noise ratio (SNR) and sensitive to the magnitude of the clock phase error according to an exemplary embodiment of the disclosure.

In part, the disclosure relates to a method of clock recovery from a received signal. Sampling a received signal for clock recovery may be done minimally at the symbol rate; that is, a clock may be recovered when a received signal is sampled at one sample per symbol. Lowering the sampling rate in this way may greatly reduce the power consumption of analog-to-digital conversion (ADC) and digital signal processing. In some embodiments, the methods and devices disclosed herein may apply to various receivers including DSP receivers and other receivers that run at the symbol rate. In some embodiments, receivers are run at symbol-rate to minimize the power consumption of ADC/DAC, DSP and other components. In many embodiments, the receivers are coherent receivers and/or configured for use in a coherent optical communication system.

Applications may be sensitive to error in the phase of a recovered clock. In some embodiments, the current disclosure teaches a method of clock recovery that accurately predicts clock error phase over the entire clock period. In addition, the method of the current disclosure is not sensitive to variations in signal-to-noise ratio (SNR). During operation, in some embodiments, symbol-rate run DSP receivers lose spectral line at clock frequency. In various embodiments, to compensate for, or prevent the loss of a spectral line, the disclosure provides for some embodiments to transform or operate upon the received symbol-rate signal into a new cyclostationary signal and recover the spectral correlation property and thereby provide for clock recovery. One or more non-linear operators may be used which map one vector space into another vector space.

In some embodiments, the current disclosure teaches a method that recovers a clock from a sampled signal by computing a spectral line from the spectral correlation of a received signal. However, Applicant has realized that a spectral correlation of frequency components spaced at the symbol rate is absent from signals sampled at the symbol rate. Therefore, in some embodiments, the current disclosure relates to a method of clock recovery from signals sampled at the symbol rate wherein samples are zero-padded, filtered with a low-pass filter, and modified with a non-linear operator so that the spectral correlation and thus the clock may be accurately recovered.

Since the power consumption of digital signal processing (DSP) and analog-to-digital conversion (ADC) modules in a telecommunications receiver is proportional to the rate of sampling of the incoming signal, reducing the sampling rate may reduce the power consumption. Sampling rate reduction is feasible for both direction-detection modulation, e.g., PAM4, and coherent, i.e. 16QAM. For clock recovery, the sampling rate may be, in principle, lowered to the symbol rate. However, in practice, clock recovery at symbol-rate sampling may be difficult to achieve. For example, a symbol-rate equalizer is very sensitive to clock errors and thus may pose stringent requirements on clock recovery.

Typically, the Mueller-Muller (MM) method is used in symbol-rate receiver DSP to estimate clock phase error. Refer now to the exemplary embodiment of FIG. 1, wherein a block diagram of the MM method is illustrated along with the expected performance of MM timing phase correction for symbol-rate coherent 16QAM modulation. Initially, samples 105 are collected from the signal. The MM method exhibits some noteworthy drawbacks. For example, beyond a certain threshold 110 in the actual timing phase of the received signal, the timing phase estimated by the MM method tends toward zero. Furthermore, the MM method is sensitive to signal-to-noise ratio (SNR), and may exhibit a large disparity in estimated timing phase under low SNR 130 vs high SNR 140 conditions. Finally, the MM method also requires adaptive equalizer 150 and clock phase recovery 160 before producing a symbol decision 170. These steps may incur extra latency cost.

Figure 2:
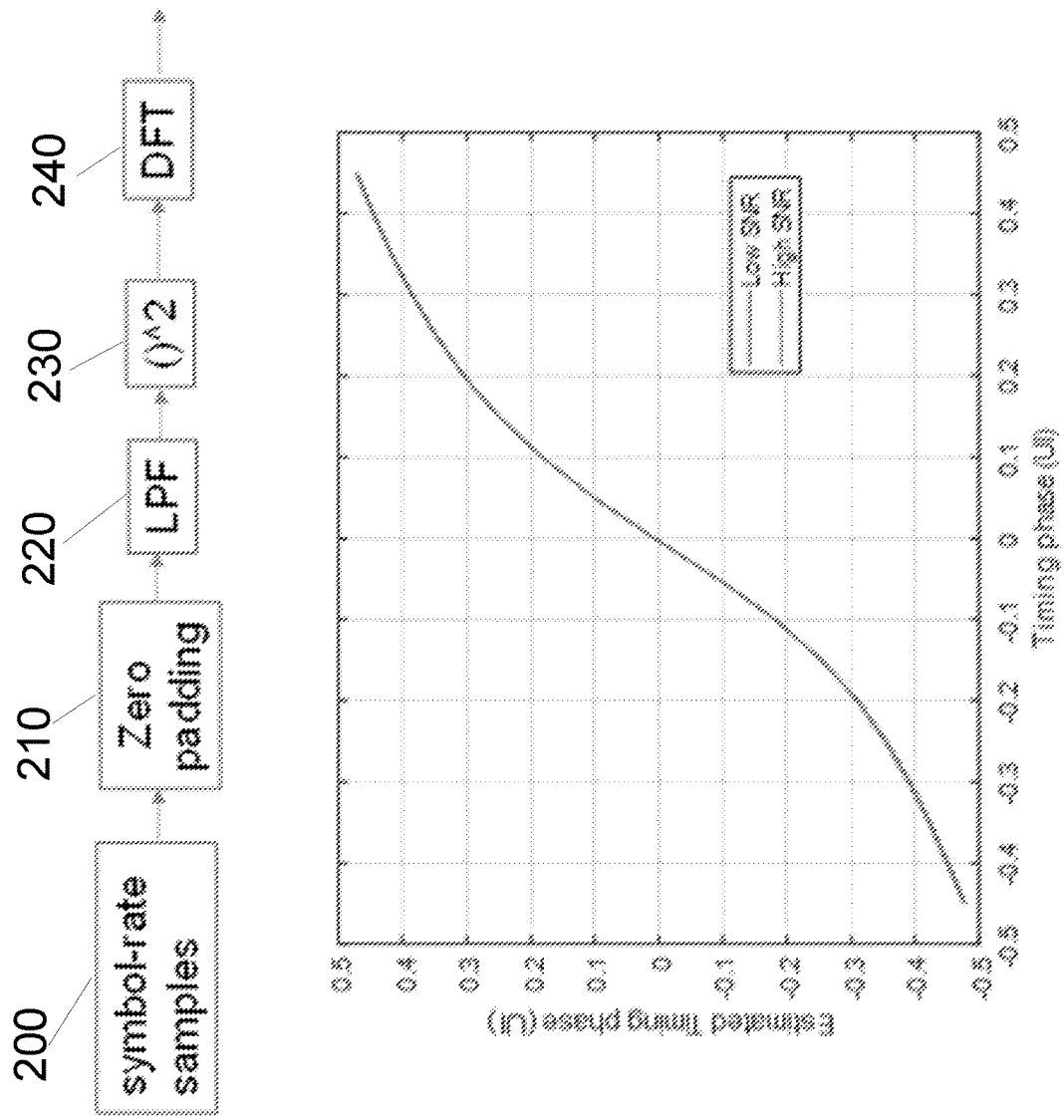
FIG. 2 is a representation of the performance of a method of clock recovery wherein estimated clock phase error is insensitive to SNR and insensitive to the magnitude of the clock phase error according to an exemplary embodiment of the disclosure.

Applicant has realized that clock phase error may be estimated, i.e. a clock may be recovered, from a signal sampled at the symbol rate based on computation of spectral correlation by digital oversampling and a nonlinear operator. The method of the current disclosure does not require equalization or carrier phase recovery, is not sensitive to SNR, and is able to estimate phase accurately over the whole symbol period. Refer now to the exemplary embodiment of FIG. 2, wherein a block diagram of the method of clock recovery of the current disclosure is illustrated along with the expected performance of the method. The performance is nearly identical in both high SNR and low SNR circumstances and is monotonic over the whole symbol period, i.e. from −0.5 of the period normalized to the unit interval (UI) to +0.5 UI. As shown in FIG. 2, a method of clock recovery from signals sampled at the symbol rate 200 wherein samples are zero-padded 210, filtered with a low-pass filter (LPF) 220, and modified with a non-linear operator 230 such as an exponential or squaring operator so that the spectral correlation and thus the clock may be accurately recovered using a discrete Fourier transform 240.

Figure 3A:
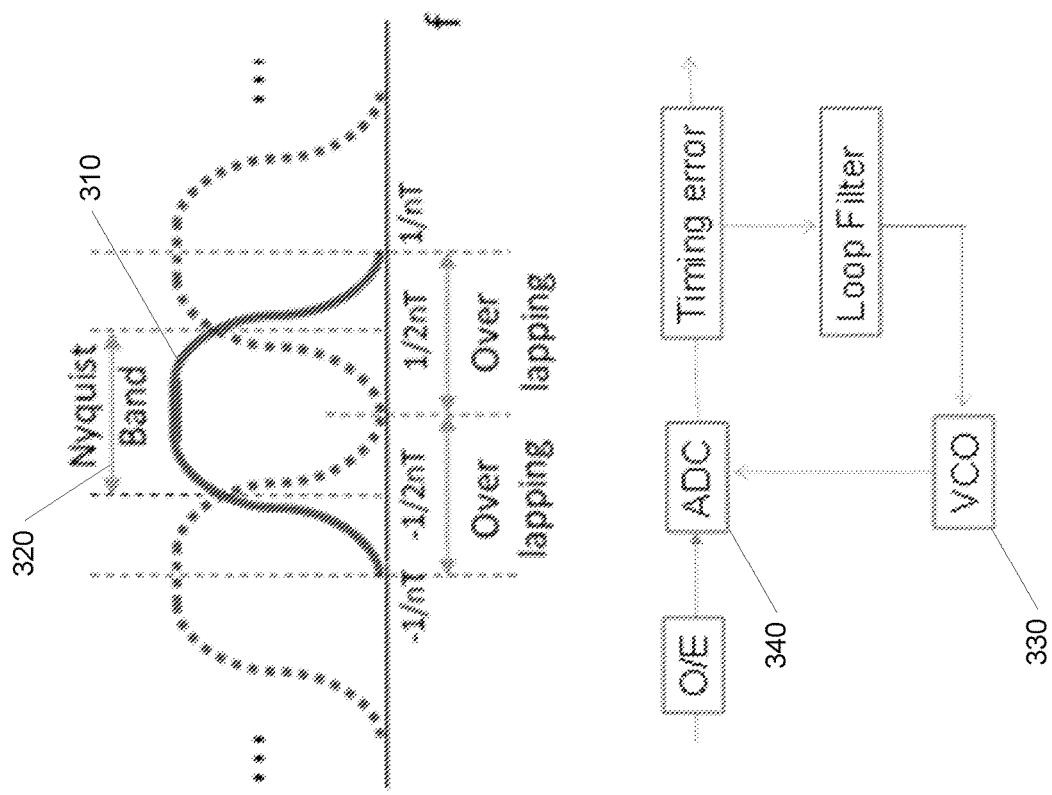
FIG. 3A is a representation of a method of estimation of clock phase error wherein a spectrum of a received signal is wider than a Nyquist band and wherein the method of estimation of clock phase error utilizes an analog-to-digital converter (ADC) modulated with a voltage-controlled oscillator (VCO) according to an exemplary embodiment of the disclosure.
Figure 3B:
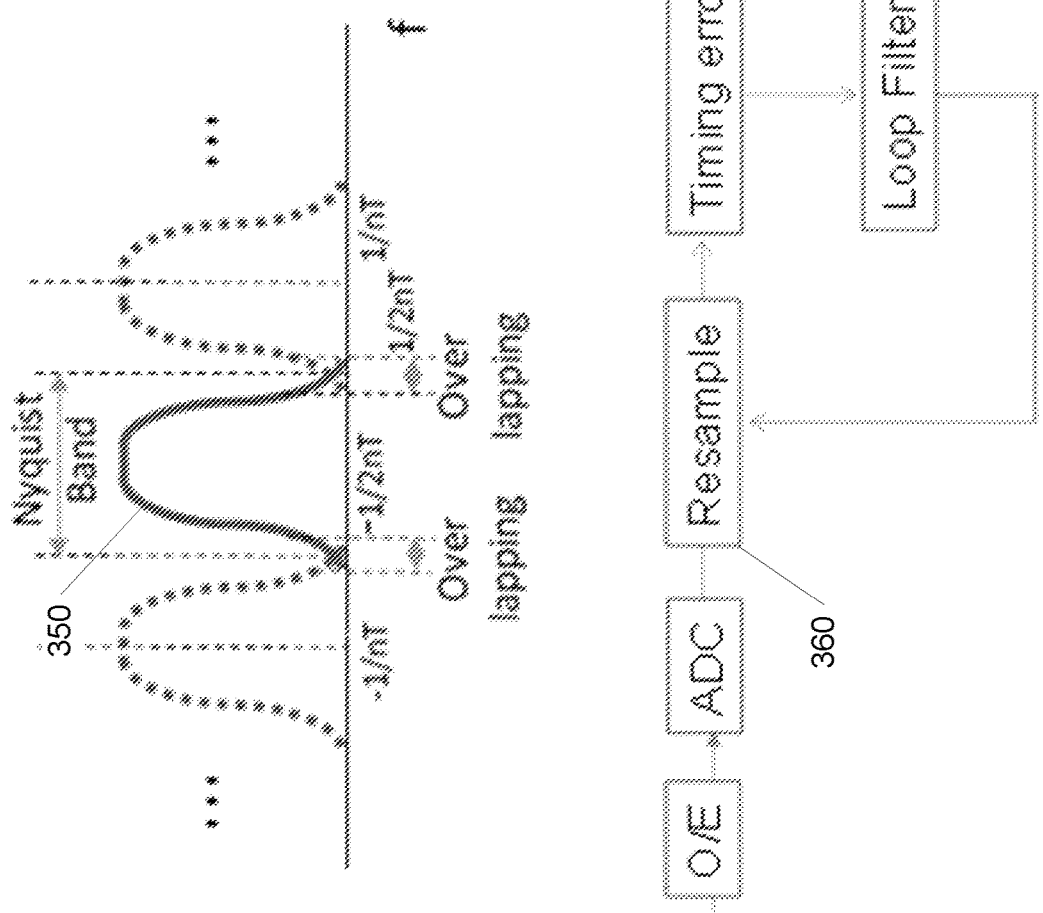
FIG. 3B is a representation of a method of estimation of clock phase error wherein a spectrum of a received signal is narrower than a Nyquist band and wherein a sampled signal is resampled according to an exemplary embodiment of the disclosure.

In some embodiments, the clock recovery method of the current disclosure uses a measured timing error as a feedback signal to an ADC. Refer now to the exemplary embodiment of FIG. 3A. If the received signal spectrum 310 has a bandwidth larger than the ADC sampling rate 320, i.e. the baud rate B, then a voltage-controlled oscillator (VCO) 330 modulates the ADC 340 for optimal sampling phase. In the absence of a VCO, spectral aliasing will occur. Refer now to the exemplary embodiment of FIG. 3B. If the signal has a super-Nyquist spectrum 350, i.e. the signal bandwidth is smaller than the ADC sampling rate, then an Rx DSP implements a digital resampling 360 of the ADC data.

Applicant has realized that a clock may be recovered by computing the spectral correlation of a received signal when that signal is sampled at some rate above the symbol rate. A set of symbols $\{a_m\}$ linearly modulated by a pulse shaping function constitutes some transmitted signal $x_a$ $$x_a(t) = \sum_{m=-\infty}^{\infty} a_m p(t - mT_s)$$

where $T_s$ is the symbol period. The mth symbol is modulated by the pulse shaping function p shifted by m symbol periods so that the transmitted symbols are encoded sequentially as a continuous-time waveform. Such a signal has two consequential properties: (1) a spectral line (SL) at the symbol frequency may be generated from the signal by means of a quadratic time-invariant transformation, and (2) frequency components in the spectrum of the signal that differ by the symbol rate $1/T_s$ are correlated, that is $$\text{spectral correlation} = \left\langle X(f)X^*\left(f - \frac{1}{T_s}\right)\right\rangle = \frac{\langle|a_m|^2\rangle}{T_s}P(f)P^*\left(f + \frac{1}{T_s}\right)$$

where $X(f)$ is the Fourier transform of the signal $x_a(t)$, $X^*$ is the complex conjugate of X, and $P(f)$ is the Fourier transform of $p(t)$.

Consider now an estimation of clock phase when a received signal is sampled at twice the symbol rate, producing two samples per symbol. The signal samples $\{x_n\}$ may be expressed in terms of the transmitted signal $x_a(t)$ and a clock phase error $\epsilon$, as $$x_n = x_a(nT - \epsilon T_s) = \sum_{m=-\infty}^{\infty} a_m p(nT - 2\epsilon T - 2mT), |\epsilon| < \frac{1}{2}.$$

The sampling period $T=T_s/2$ is half the symbol period, and the clock phase error $\epsilon$ is normalized to the symbol period $T_s$. A spectral line at the symbol rate can be generated from N-length sampled data $\{x_n\}$ as $$SL = \sum_{n=0}^{N-1} |x_n|^2 e^{-\frac{j2\pi n}{N}(N/2)} = \sum_{n=0}^{N-1} x_n \left(x_n e^{\frac{j2\pi n}{N}(N/2)}\right)^* = \sum_{k=0}^{N-1} X_k X_{k-N/2}^*$$

where the final step is by application of Parseval's theorem. The spectral line can be shown to be related to the spectral correlation in the discrete case. Obtaining $\{X_k\}$ from $\{x_n\}$ may be performed using a DFT as discussed below. For example, in one embodiment, by using a notation $p_n=p(nT)$ to represent a digital sample of the pulse shaping function at a multiple n of the sampling period T, then $$x_n = \sum_{m=-\infty}^{\infty} a_m p_{n-2\epsilon-2m}$$

and $$X_k = DFT(x_n) = \sum_{n=0}^{N-1} \sum_{m=0}^{\frac{N}{2}-1} a_m p_{n-2\epsilon-2m} e^{-\frac{j2\pi kn}{N}}, k = 0, 1, \ldots N-1.$$

Since $$P_k = DFT(p_n) = \sum_{n=0}^{N-1} p_n e^{-\frac{j2\pi kn}{N}},$$

then $$X_k = \sum_{m=0}^{\frac{N}{2}-1} a_m P_k e^{-\frac{j2\pi k(2\epsilon+2m)}{N}}$$

and thus the spectral correlation is $$X_k X_{k-N/2}^* = \sum_{m=0}^{\frac{N}{2}-1} a_m P_k e^{-\frac{j2\pi k(2\epsilon+2m)}{N}} \sum_{n=0}^{\frac{N}{2}-1} a_n^* P_{k-\frac{N}{2}}^* e^{-\frac{j2\pi(k-N/2)(2\epsilon+2m)}{N}}.$$

Finally, since the data symbols are independent $$\langle X_k X_{k-N/2}^*\rangle = \frac{\langle|a_m|^2\rangle N}{2} P_k P_{k-N/2}^* e^{-j2\pi\epsilon}.$$

The spectral line $$SL = \sum_{k=0}^{N-1} X_k X_{k-N/2}^*$$

is then a summation of the spectral correlation of frequency components k and k−N/2 which have spacing equal to the baud rate as N/2. In some embodiments, the whole frequency spectrum, equal to twice the baud rate when the sampling rate is 2 samples per symbol, is divided into N frequency bins and thus the baud rate is N/2. Because the spectral correlation carries information about the clock phase error $\epsilon$, the spectral line also carries information about the clock phase error. Furthermore, since the pulse shaping function p is real and even, $P_k$ is real and thus the clock phase error $\epsilon$ may be estimated as the argument of the spectral line as shown below $$\epsilon = \frac{1}{2\pi}\arg(\langle SL\rangle).$$

Figure 4:
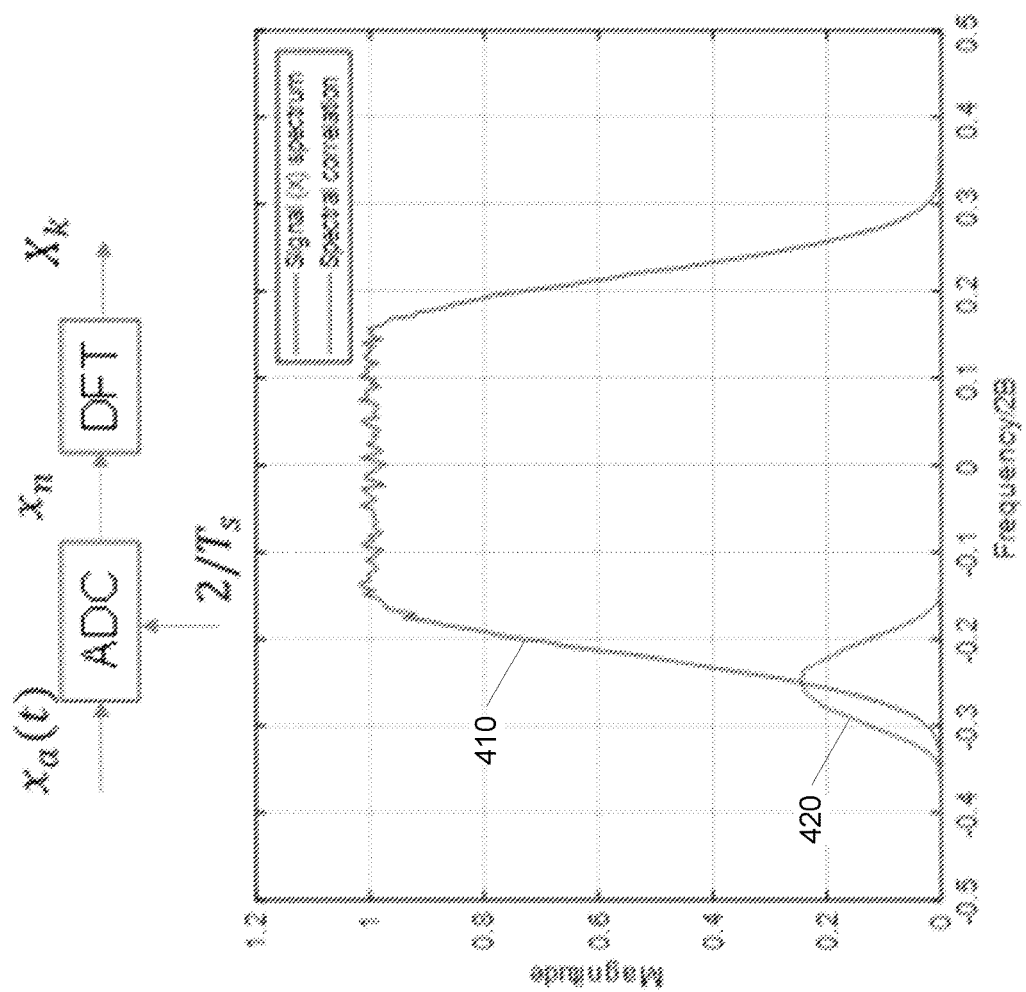
FIG. 4 is a representation of a spectrum and a spectral correlation of a signal wherein the signal is sampled at a rate of two samples per symbol according to an exemplary embodiment of the disclosure.

Refer now to the exemplary embodiment of FIG. 4, wherein the power spectrum $\langle X_k X_k^*\rangle$ 410 and the spectral correlation $\langle X_k X_{k-N/2}^*\rangle$ 420 of a root-raised cosine (RRC) modulated signal sampled at a rate of two samples per symbol are illustrated. As the spectral line is a summation of the spectral correlation, the spectral line is the area under the spectral correlation curve 420 in FIG. 4. The spectral line is non-zero and thus may be used to compute a clock phase error.

In some embodiments, the method of the current disclosure, however, estimates a clock phase error accurately for a signal sampled at one sample per symbol rather than two samples per symbol. Consider now an estimation of a clock phase error of a linear modulated signal sampled at the symbol rate, i.e. sampled at one sample per symbol. Under these conditions, the sampling period of an ADC is equal to the period of the sample, $T=T_s$. The signal samples $\{x_n\}$ may be expressed again in terms of the transmitted symbols $\{a_m\}$, the transmitted signal $x_a$, the pulse shaping function p, and the clock phase error $\epsilon$ $$x_n = x_a(nT_s - \epsilon T_s) = \sum_{m=-\infty}^{\infty} a_m p(nT_s - \epsilon T_s - mT_s), |\epsilon| < \frac{1}{2}.$$

As will be demonstrated, the spectral line $$SL = \sum_{k=0}^{N-1} X_k X_{k-N/2}^*$$

cannot be used directly in symbol-rate receiver DSP to estimate a clock phase error for a signal sampled at the symbol rate. Instead, to double the frequency span to twice the baud rate, a new digital sequence $\{x_n'\}$ is synthesized by zero-padding the original samples $\{x_n\}$ and interpolating the result with a low-pass filter $h_n$ $$x_n' = \sum_{l=-\infty}^{\infty} h_{n-2l} x_l$$
$$= \sum_{m=-\infty}^{\infty} a_m \sum_{l=-\infty}^{\infty} h_{n-2l} p(lT_s - \epsilon T_s - mT_s).$$

The result is a sequence $\{x_n'\}$ that samples a continuous-time signal $x_a'(t)$ at two samples per symbol, i.e. $x_n'=x_a'(nT)$ where $$T = \frac{T_s}{2}.$$

The continuous time signal may be expressed in terms of a new pulse shaping function g $$x_a'(t) = \sum_{m=-\infty}^{\infty} a_m g(t - mT_s).$$

Samples of the pulse shaping function are $$g(nT - mT_s) = \sum_{l=-\infty}^{\infty} h_{n-2l} p(lT_s - \epsilon T_s - mT_s),$$

and so $$x_n' = \sum_{m=-\infty}^{\infty} a_m g(nT - mT_s).$$

Figure 5A:
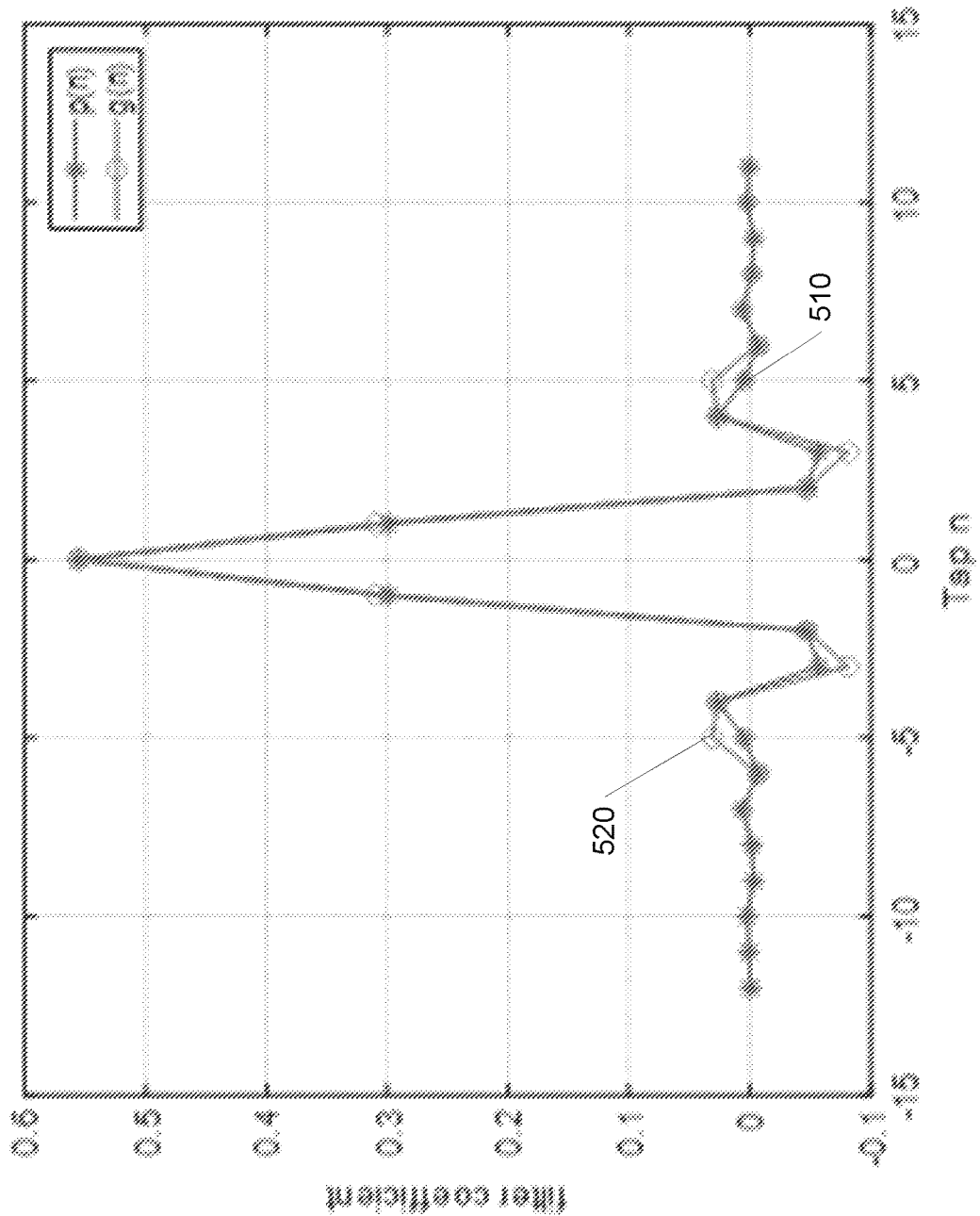
FIG. 5A is a representation of pulse shaping functions wherein a clock phase error of zero is present according to an exemplary embodiment of the disclosure.

Refer now to the exemplary embodiment of FIG. 5A, wherein p(n) 510 and g(n) 520 sample their continuous-time analogues at two samples per symbol, wherein p(t) is a RRC filter with roll-off factor equal to 0.4, and wherein both p(n) and g(n) carry a clock phase error $\epsilon = 0$. Also refer to the exemplary embodiment of FIG. 5B, wherein p(n) 550 and g(n) 560 sample their continuous-time analogues at two samples per symbol, wherein p(t) is a RRC filter with roll-off factor equal to 0.4, and wherein both p(n) and g(n) carry a clock phase error $\epsilon = 0.5$.

Figure 5B:
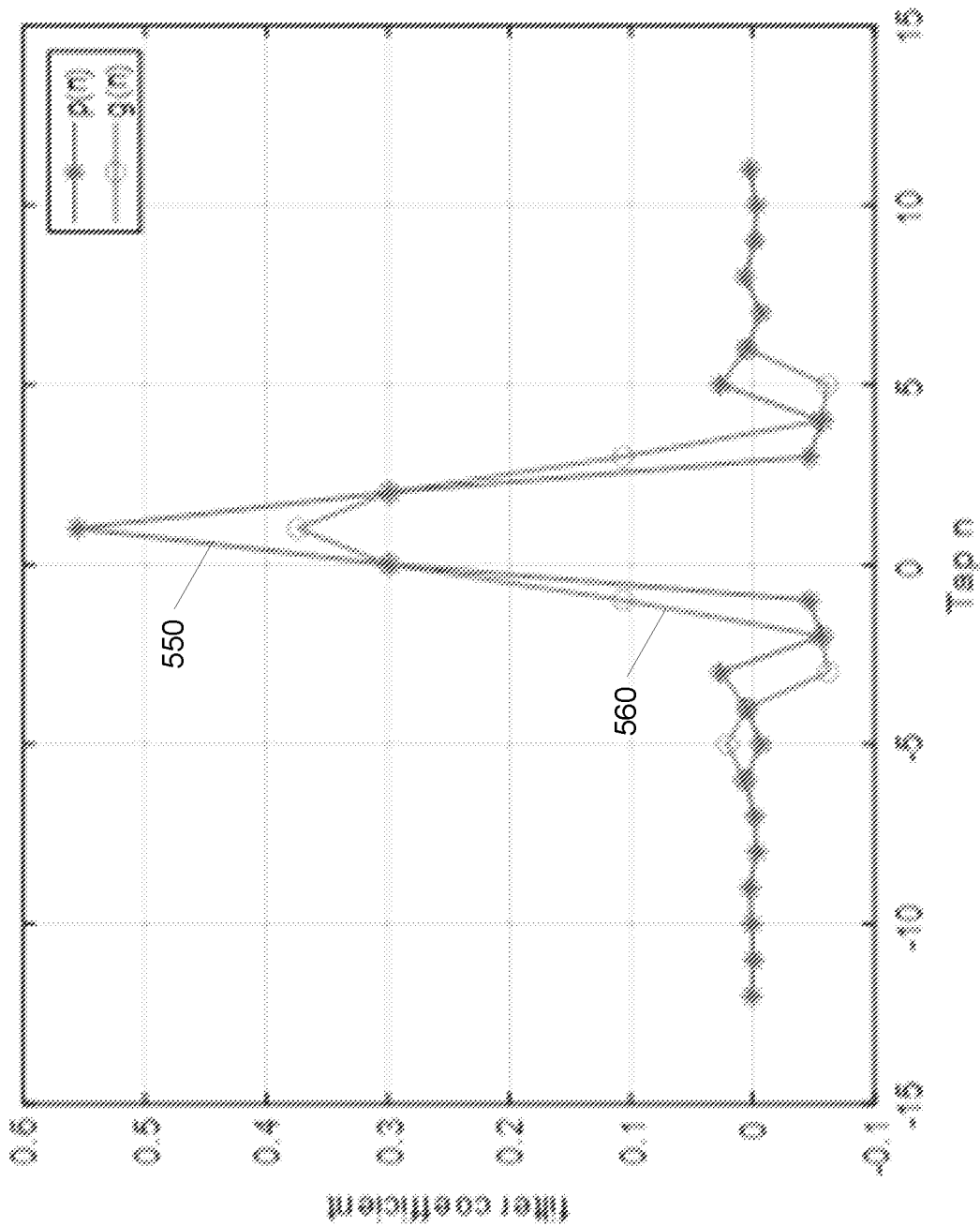
FIG. 5B is a representation of pulse shaping functions wherein a clock phase error of half the symbol period is present according to an exemplary embodiment of the disclosure.
Figure 6A:
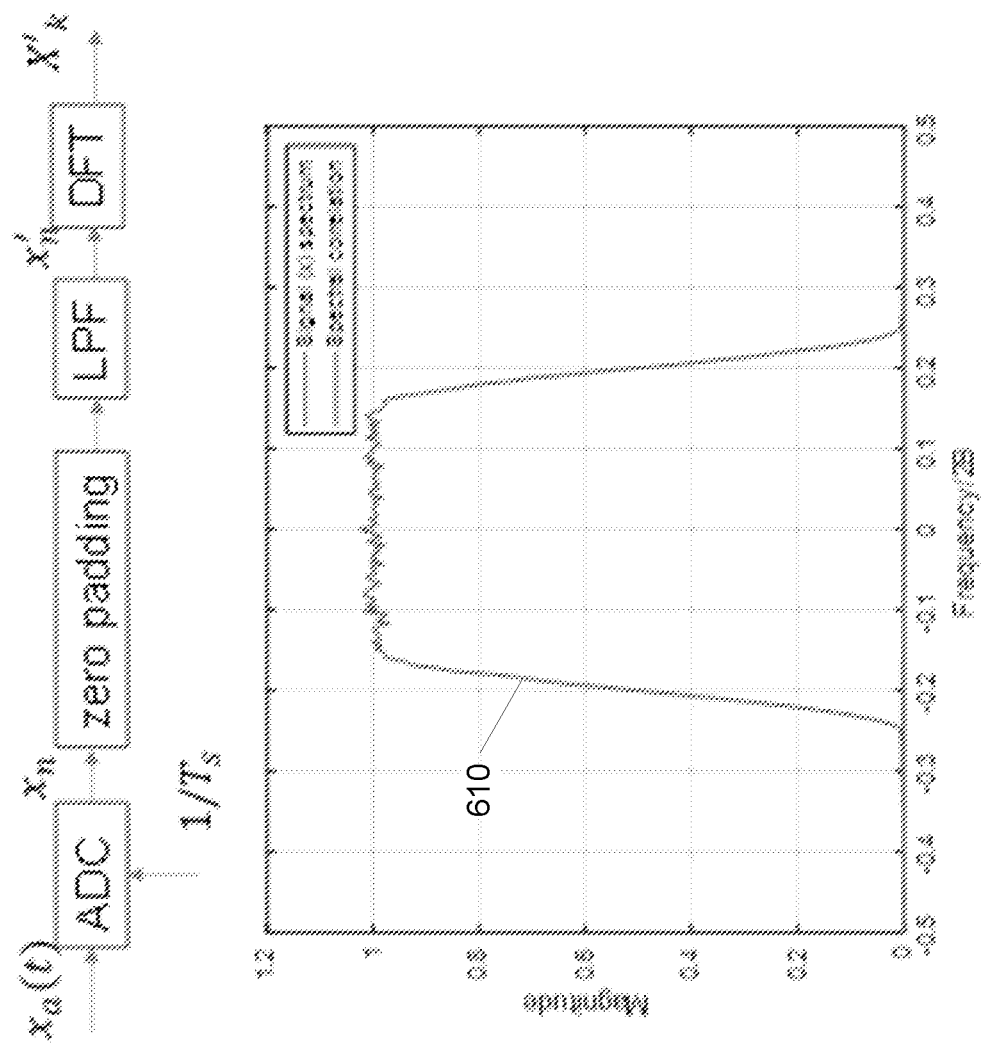
FIG. 6A is a representation of a spectrum and a spectral correlation of a signal wherein the signal is sampled at a rate of one sample per symbol and wherein samples are zero-padded and filtered with a low-pass filter according to an exemplary embodiment of the disclosure.

Note that in both FIGS. 5A and 5B, the peaks of each curve 510 and 520, 550 and 560 are aligned, indicating that clock phase information is preserved whether at one sample per symbol or two samples per symbol. Finally, refer to the exemplary embodiment of FIG. 6A, wherein the spectrum 610 of the samples $\{x_n'\}$ is plotted along with the spectral correlation $\langle X_k' X_{k-N/2}'^* \rangle$ over the frequency span of 2B. The spectral correlation is in fact not measurable because there is no signal outside of the Nyquist band.

To recover the spectral correlation, a non-linear operator is applied to the sequence $\{x_n'\}$ $$x_n'' = (x_n')^2.$$

Figure 6B:
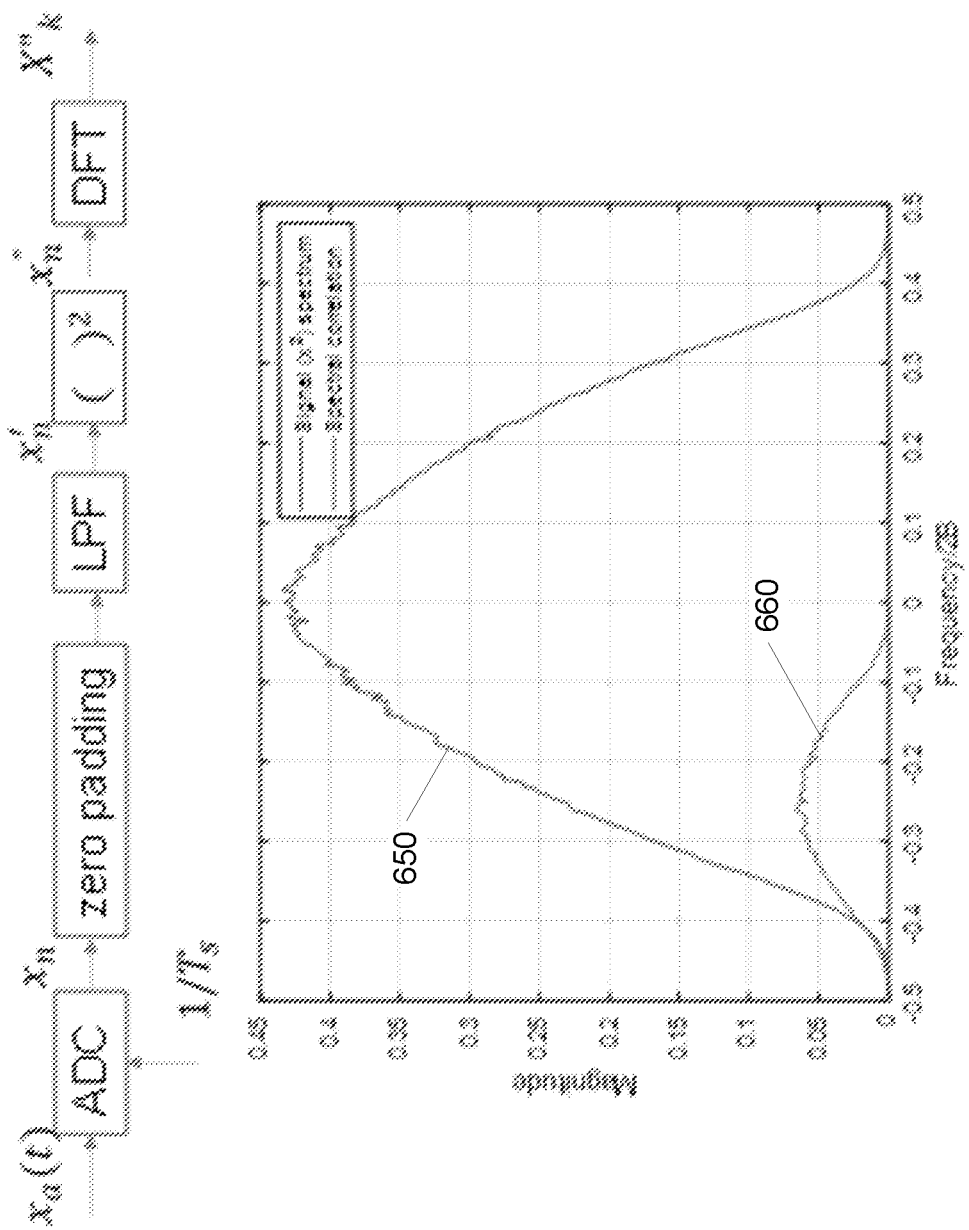
FIG. 6B is a representation of a spectrum and a spectral correlation of a signal wherein the signal is sampled at a rate of one sample per symbol and wherein samples are zero-padded, filtered with a low-pass filter, and finally transformed with a non-linear operator according to an exemplary embodiment of the disclosure.

In some embodiments, the non-linear operator is a squaring or exponential operation or a combination of non-linear operations to map one vector space to another. In various embodiments, a non-linear operator applied to the original samples does not cause aliasing since there are no frequency components outside of the Nyquist band. The clock information does not change with the nonlinear operator $(\bullet)^2$ when the pulse shaping function is real and even. Refer now to the exemplary embodiment of FIG. 6B, wherein the spectrum 650 of the samples $\{x_n''\}$ is plotted along with the spectral correlation 660 $\langle X_k'' X_{k-N/2}''^* \rangle$. The spectral correlation for a signal sampled at one sample per symbol is recovered when samples are zero-padded, filtered with a low-pass filter, and then squared. Finally, the clock phase error e may be estimated as shown below $$\epsilon = \frac{1}{2\pi} \arg\left(\left\langle \sum_{k=0}^{N-1} X_k'' X_{k-N/2}''^* \right\rangle\right).$$

Refer now again to the exemplary embodiment of FIG. 2, wherein the performance of the method of the current disclosure of clock recovery at the symbol rate is shown to be resilient to variation in SNR and is shown to recover clock phase accurately over the whole range of the symbol period normalized to the unit interval (UI), i.e. from −0.5 UI to +0.5 UI.

In some embodiments, one or more operators are used to transform signals generated using a cyclostationary process such as symbol-rate signals to a new cyclostationary signal. A spectral correlation property, feature, or parameter that is lost from a first signal may be recovered by applying a transform or operator such as a non-linear transform or operator to generate a second signal with the recovered property, feature or parameter. In various embodiments, a clock reference signal component such as line, fiducial, edge or data point are recovered using the devices and methods disclosed herein.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of clock recovery comprising:
sampling one or more signals at a symbol rate to generate a set of samples;
zero-padding one or more samples in the set of samples;
filtering the one or more zero-padded samples with a filter to generate a set of filtered samples; and
modifying the set of filtered samples by applying a non-linear operator to generate an output comprising a spectral correlation.

2. The method of claim 1, wherein the spectral correlation does not change for the one or more signals at the symbol rate when a signal-to-noise ratio varies based on increasing and decreasing noise levels.

3. The method of claim 1, wherein a spectral correlation of frequency components spaced at the symbol rate is absent from the one or more signals sampled at the symbol rate.

4. The method of claim 1, wherein the filter is a low pass filter.

5. The method of claim 1 further comprising recovering a clock of at least one of the one or more signals from the set of samples by computing a spectral line.

6. The method of claim 5, wherein the zero-padding and filtering steps are performed such that one sample per symbol is recovered.

7. The method of claim 6, further comprising estimating one or more-a clock phase errors over a clock period with regard to the recovered clock.

8. The method of claim 7, wherein the clock phase errors is $\epsilon$, wherein $$\epsilon = \frac{1}{2\pi}\arg\left(\left\langle \sum_{k=0}^{N-1} X_k'' X_{k-N/2}''^* \right\rangle\right).$$

9. The method of claim 5 wherein the clock may be recovered when sampling is performed at one sample per symbol.

10. The method of claim 1, wherein the spectral correlation is $\langle X_k X_{k-N/2}^* \rangle$, wherein N is a DFT size, wherein $X_k = \text{DFT}(x_n)$, wherein $x_n$ is N-length sampled data.

11. The method of claim 1, wherein the non-linear operator is $(x_n')^2$, wherein $x_n'$ is the set of filtered samples.

12. The method of claim 1, wherein the non-linear operator is an exponential operator.

13. The method of claim 1, wherein the non-linear operator is configured to modify the set of filtered samples such that spectral correlation does not vanish when signals are sampled at the symbol rate.

14. The method of claim 1 wherein the sampling comprises sampling a continuous-time signal $x_a'$.

15. The method of claim 1, wherein applying the non-linear operator does not cause aliasing.

* * * * *

UNITED STATES PATENT AND TRADEMARK OFFICE
CERTIFICATE OF CORRECTION

PATENT NO.        : 12,362,901 B1
APPLICATION NO.   : 17/581483
DATED             : July 15, 2025
INVENTOR(S)       : Hongbin Zhang It is certified that error appears in the above-identified patent and that said Letters Patent is hereby corrected as shown below:

In the Specification

Under Column no. 8, Line no. 7, Replace:
"$\langle X_k' X_{k-N/2}{*}' \rangle$"
With:
$$\langle X'_k X'^{*}_{k-N/2} \rangle$$

Under Column no. 8, Line no. 26, Replace:
"$\langle X_k'' X_{k-N/2}{*}'' \rangle$."
With:
$$\langle X''_k X''^{*}_{k-N/2} \rangle.$$

Under Column no. 8, Line no. 30, Replace:
"error e"
With:
--error $\in$--

In the Claims

Under Column no. 10, Claim 7, Line no. 49, Replace:
"one or more-a"
With:
--a--

Under Column no. 10, Claim 9, Line no. 59, Replace:

Signed and Sealed this
Sixteenth Day of September, 2025

Coke Morgan Stewart
*Acting Director of the United States Patent and Trademark Office*

"when"
With:
--when the--

Under Column no. 11, Claim 14, Line no. 6, Replace:
"xa'."
With:
--x'a(t).--